United States Patent [19]

Wukowitz

[11] Patent Number: 5,242,132
[45] Date of Patent: Sep. 7, 1993

[54] MULTI-HULLED AIRCRAFT/BOAT

[76] Inventor: Edward Wukowitz, 3100 NE. 47th Ct., Apt. 305, Fort Lauderdale, Fla. 33308

[21] Appl. No.: 861,188

[22] Filed: Mar. 31, 1992

[51] Int. Cl.⁵ .............................................. B64C 35/00
[52] U.S. Cl. ..................................... 244/106; 244/36; 244/105; 244/12.4; 244/56; 114/262
[58] Field of Search ............... 244/56, 105, 106, 12.4, 244/23 D, 56, 66, 23 B; 114/261, 262, 288

[56] References Cited

U.S. PATENT DOCUMENTS

| | | | |
|---|---|---|---|
| 1,930,922 | 10/1933 | Burnelli | 244/87 X |
| 3,023,981 | 3/1962 | Reiniger | 244/12.4 |
| 3,026,065 | 3/1962 | Holland | 244/12.4 |
| 3,049,320 | 8/1962 | Fletcher | 244/12.4 |
| 3,159,361 | 12/1964 | Weiland | 244/106 |
| 3,244,246 | 4/1966 | Weiland | 244/23 B |
| 3,854,679 | 12/1974 | Smethers | 244/106 |
| 4,415,131 | 11/1983 | Bertelsen et al. | 244/87 X |
| 4,691,881 | 9/1987 | Gioia | 114/288 X |

OTHER PUBLICATIONS

"Ocean Surface Vessels" Martin Aeroplane Development Lab. Inc.

*Primary Examiner*—Joseph F. Peters, Jr.
*Assistant Examiner*—Christopher P. Ellis
*Attorney, Agent, or Firm*—Malin, Haley, DiMaggio & Crosby

[57] ABSTRACT

An amphibious aircraft capable of V-STOL operations, the aircraft comprised of a pair of buoyant, coterminus, and elongated body members having an axially converging and diverging profile, joined together at the forward end thereof by a forward fuselage having at least one cambered surface, the entire structure thereof functioning as a lifting body, the forward fuselage having a pair of wings rigidly attachable thereto, and at least one propulsion unit attachable thereto proximal to the aircraft's longitudinal centerline, whereby the transition between vertical and conventional flight modes may be accomplished, the aircraft further having a stabilizer for pitch and yaw control which are pivotally and hingedly attachable to the rear of said elongated body members.

13 Claims, 6 Drawing Sheets

MULTI-HULLED AIRCRAFT/BOAT

BACKGROUND OF THE INVENTION

1. Field of the Invention

This invention relates generally to amphibious aircraft, and more particularly, to a multi-hulled aircraft boat (hereinafter "flying boat") capable of V-STOL (Vertical Short Take-Off and Landing) operations.

2. Description of the Prior Art

In the aerospace industry, it has long been desirous to produce practical and efficient aircraft capable of vertical take-off and landing, thus obviating the need for expansive airports required by conventional aircraft. Because a conventional aircraft's take-off and landing performance is dictated by its stalling speed, the speed at which the wings' angle of attack will cause sufficient separation and turbulent air flow that it will cease to provide adequate lift, such an aircraft requires runways of sufficient length such that take-off and landing roll-outs can be performed with adequate safety margins. Over the last several decades, advances in aerodynamic technology, such as slotted wing flaps and slats and surface blowing, have resulted in lowering the stalling speeds of high performance aircraft, consequently providing them with higher safety margins and allowing the operation of larger aircraft from smaller runways. Nevertheless, the quest for aircraft capable of vertical take-off and landing has spawned a large array of unusual configurations, ranging from the conventional helicopter to the state of the art Bell-Boeing V-22 Osprey tilt rotor and McDonnell-Douglas AV-8B Harrier II.

The most common configuration of vertical take-off and landing aircraft is the helicopter. The helicopter is capable of true vertical flight, including the ability to hover in place, fly forward and aft, and from side to side. Unfortunately, the helicopter has many limitations, the most significant thereof being its mechanical complexity and high operational expense. Moreover, the principles of aerodynamics result in obvious limitations on performance, most notably the low maximum attainable forward velocities and reduced range when compared with fixed wing aircraft, attributable to the high drag and structural limits of the rotor system and high power to payload ratio.

One notable helicopter derivative that has generated considerable interest with the U. S. military is the Bell-Boeing V-22 Osprey, actually a hybrid aircraft which combines the vertical mobility of a helicopter with the cruising speed of a turboprop transport. This unique aircraft is actually a derivative of the Bell XV-15, developed pursuant to a U.S. Army contract in 1972. It comprises a pair of tiltable rotor units which are mounted on each wing tip, each capable of being rotated at varying angles of incidence relative to the aircraft itself, such that vertical take-off and landing and the transitions therebetween may be accomplished. While this design is fairly practical, it has some serious drawbacks, the most serious thereof being the necessity to cross-shaft both engines in the event of an engine failure to eliminate asymmetrical thrust and consequent loss of control, and the high moments of inertia that need be overcome along the aircraft's roll axis, resulting in sluggish turning performance and overall reduced maneuverability. Because of the cross-shafting requirement and the outboard wing location, this power plant configuration results in a higher dry weight by virtue of the extensive transmission hardware and stronger wings required to support such a design.

Similar aircraft in this area, such as the tilt wing Boeing Vertol Model 76, are even more complex and have experienced such problems as wing stalling during the transition between vertical and conventional flight.

Yet another notable design in this area is the Doak X-16, a tilt duct aircraft having a pair of ducted fans disposed on opposite wing tips similar to the configuration of the Bell Boeing V-22 Osprey, and obviously having similar disadvantages.

The present invention is directed to a V-STOL flying boat which is capable of making the transition from vertical to conventional flight without the need for heavy and complex cross-shafting and which, by virtue of its power plant location, lifting body type fuselage, and smaller wing, results in enhanced performance.

SUMMARY OF THE INVENTION

In accordance with the instant invention, there is disclosed a V-STOL amphibious aircraft capable of short take-off and landing from land or water. The aircraft configuration comprises a pair of buoyant, coterminous, and elongated body members having an axially converging and diverging profile, joined together by a forward fuselage having at least one cambered surface, the entire structure thereof functioning as a lifting-body. A pair of wings optimally designed for the envisioned operating envelope are attached to the forward fuselage at a station location dictated by center of gravity and center of lift considerations and are constructed from materials in accordance with standard aircraft design. The wings may include flaps and slats for enhanced stall performance during slow conventional flight, and ailerons and/or spoilers for roll control. Stabilizer means for imparting pitch and yaw stability and modulation are attached to the aft end of each of the elongated body members and may be of the conventional vertical and horizontal stabilizer arrangement comprising twin rudders and an elevator therebetween in accordance with standard aircraft design, or a unified tail structure as disclosed herein, comprising an arcuate airfoil section, the entire assembly or a part thereof hingedly and pivotally connected to each elongated body member to permit movement and control along three axes.

At least one propulsion unit is pivotally attached to the forward fuselage by pivotal attachment means extending vertically outward therefrom, proximal to the longitudinal centerline of the aircraft. This will ensure limited asymmetrical thrust-induced rolling moments, thus obviating the requirement for weight-producing cross-shafting the power plants in the event of an engine failure as disclosed in the prior art. In the preferred embodiment, each propulsion unit is a ducted fan configuration, comprising an air flow contoured cylindrical shroud and an attached and collinearly disposed center body comprising: a spinner and attached fan blades, an engine and gear box, the center body attachable to the cylindrical shroud by a plurality of stator vanes, in a manner well known in the art. The ducted fan design confers the following advantages: more thrust per engine horsepower than an open propeller, reduced propeller diameter and wider choice of power source, including high-output automotive engines, reduction in propeller-generated noise, protection of the fan from potential impact with foreign objects or debris and consequent damage, and protective shielding from injurious contact with the fan blades. The fan unit parameters, such as inlet and outlet cross-sectional area, shroud thickness, and blade design and orientation, are determined in accordance with performance requirements by methods well known in the arts of aerodynamics and aircraft design.

Each ducted fan unit has integral pivotal attachment means disposed axially aft of the center of gravity thereof, whereby the center of gravity of said fan units and thus the aircraft may be translated toward the center of lift, thereby reducing undesirable pitching moments about the aircraft's center of gravity generated during vertical flight modes.

If desired, an alternate method of controlling the center of gravity location may be accomplished by locating fuel tanks at forward and aft positions and interconnecting them by a microprocessor controlled fuel transfer system which transfers fuel therebetween based on parameters which take into account the aircraft's gross weight, flying speed, altitude, orientation, and load factors during the transitory period between vertical and conventional flight.

The upper surface of the forward fuselage is cambered in such a manner as to optimize the air flow thereover generated by the ducted fans such that additional lift is induced in accordance with the "coanda effect" pursuant to the Bernoulli principle, which results in lift generated when air flow accelerates to a higher velocity on one side of a two-sided body, thus causing a corresponding pressure drop and associated suction from the resulting pressure differential.

The converging and diverging elongated body member profile maximizes the ram air thrust effect similar to that created by my ground effect craft with divergent channel, U.S. Pat. No. 3,726,246, the disclosure of which is hereby incorporated by reference as though fully set forth herein. This provides optimum marine performance, thus minimizing power requirements during water maneuvering.

In accordance with the present invention, it is an object thereof to provide a flying boat capable of vertical short take-off and landing operations.

It is a further object of the present invention to provide a flying boat which comprises dual buoyant, elongated body members joined by a forward fuselage which functions as a lifting body.

It is still another object of the present invention to provide a flying boat which comprises a plurality of ducted fan power plants disposed proximal to the longitudinal centerline thereof, thus eliminating adverse asymmetrical thrust and the necessary cross-shafting required to minimize such effects during engine out operations, resulting in higher overall performance and safety margins.

It is yet another object of the instant invention to provide a flying boat wherein the power plants are pivotally attached and disposed relative to the forward fuselage such that a smooth transition between vertical and conventional flight is possible and whereby the coanda effect induced by power plant thrust blowing over the upper cambered surface of the forward fuselage is maximized to aid in lift, thereby minimizing the wing area required for level flight and the associated weight and drag penalties.

In accordance with these and other objects which will become apparent hereinafter, the invention will now be described with particular reference to the accompanying drawings.

DETAILED DESCRIPTION OF THE PREFERRED EMBODIMENT

Figure 1:
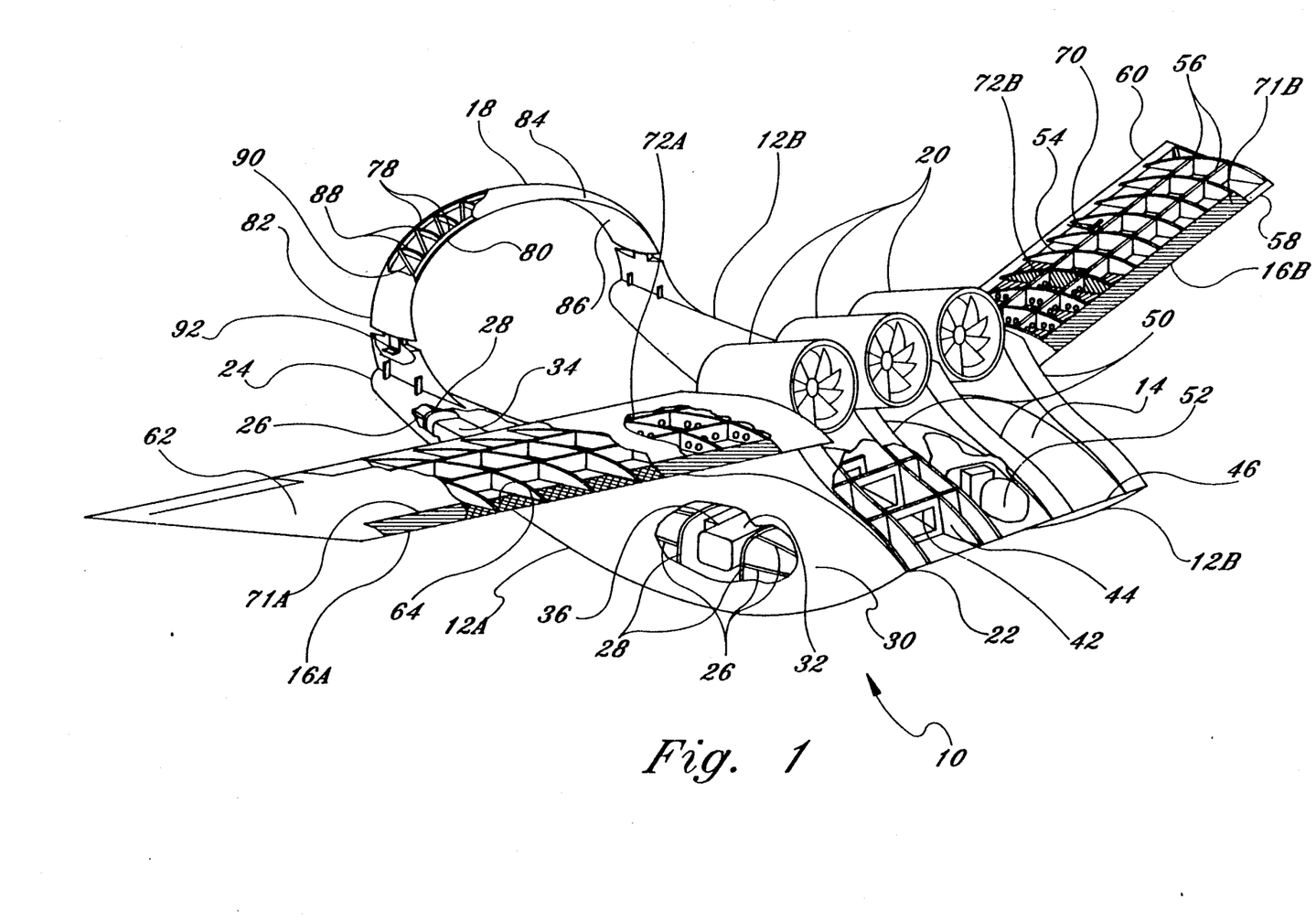
FIG. 1 is an isometric view of the flying boat in the preferred embodiment.

With reference to the several views of the drawings, there is depicted a V-STOL flying boat generally characterized by the reference numeral 10 as shown in FIG. 1 in the preferred embodiment comprising a pair of body members 12a and 12b, a forward fuselage 14, a pair of wings 16a and 16b, stabilizer means 18, and at least one propulsion means 20.

Figure 2:
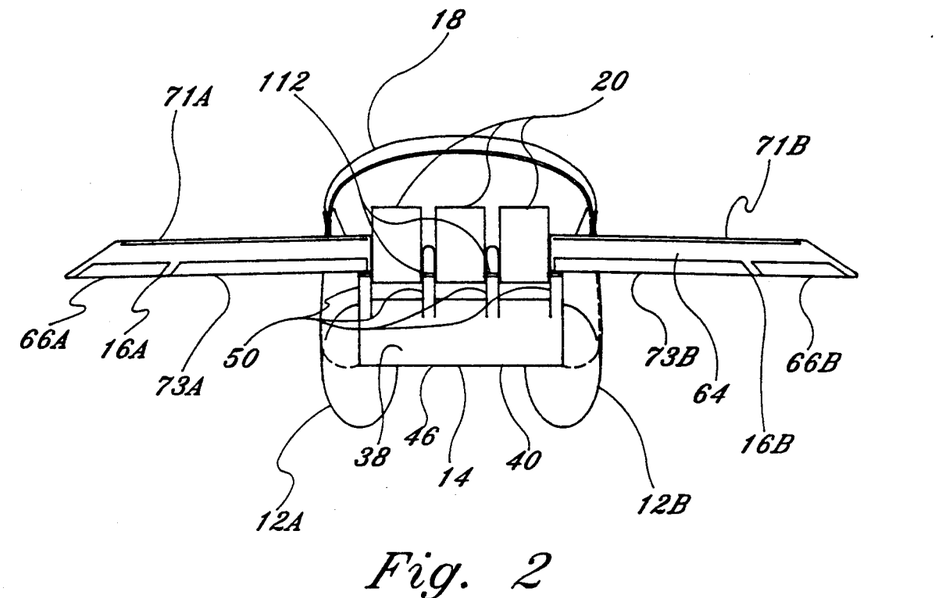
FIG. 2 is a frontal elevational view of the flying boat.
Figure 3:
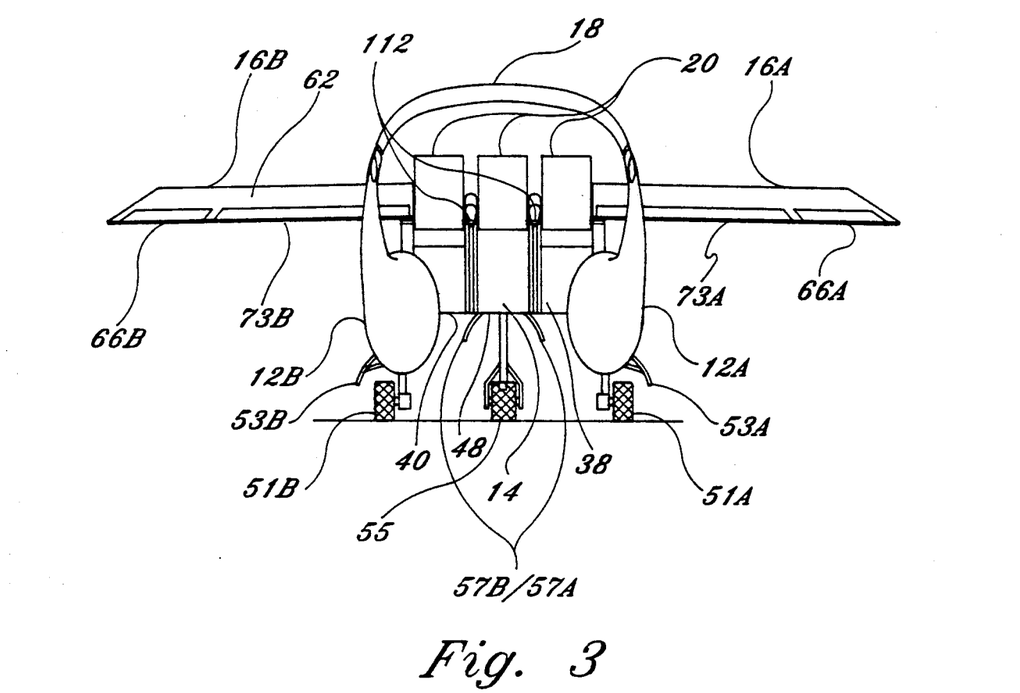
FIG. 3 is a rear elevational view of the flying boat.
Figure 4:
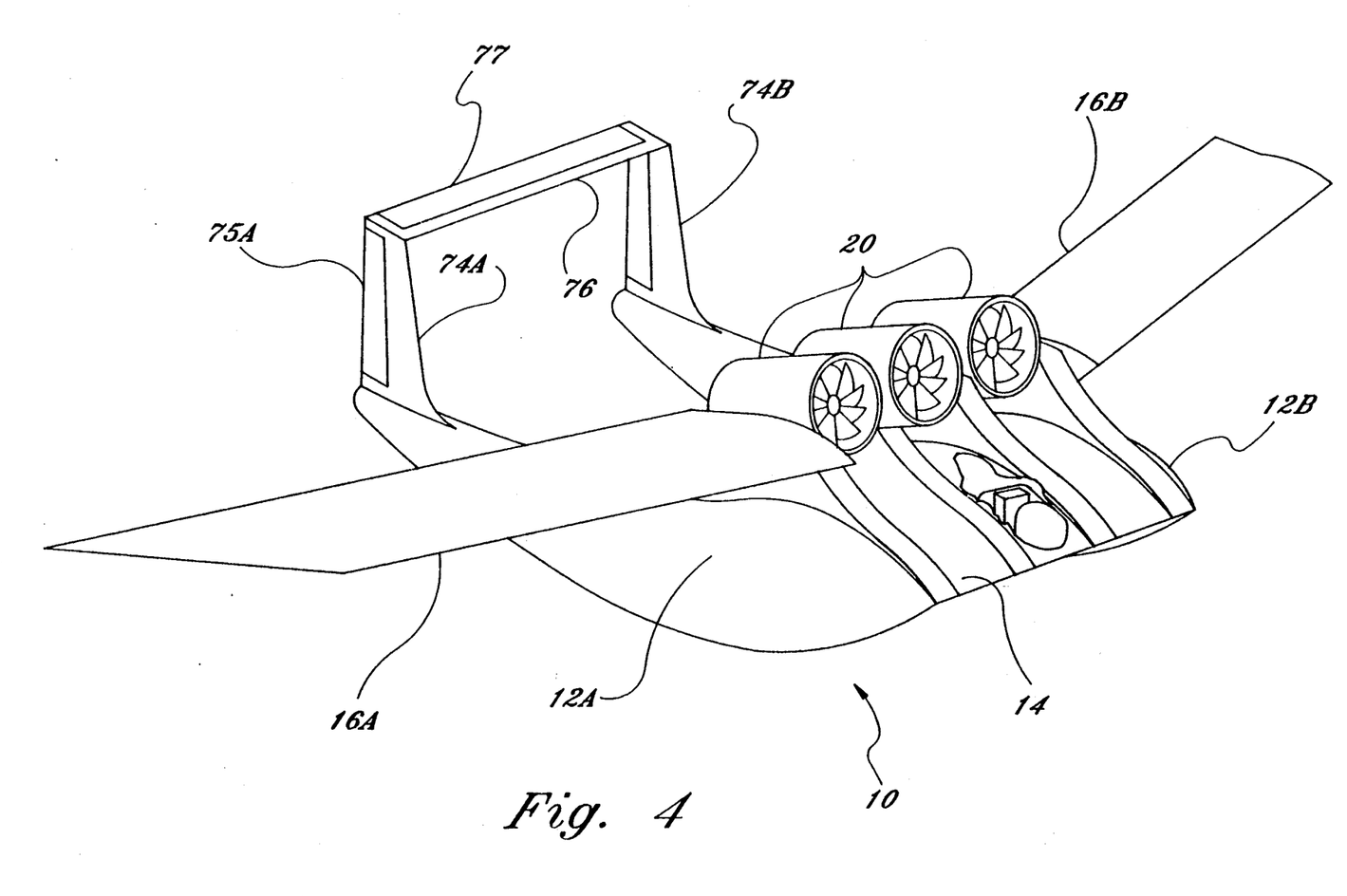
FIG. 4 is an isometric view of the flying boat with an alternative stabilizer arrangement.

Body members 12a and 12b are buoyant, elongated, and coterminous, defining an axially converging and diverging profile between first end 22 and second end 24 as illustrated in FIGS. 1 and 4. Body members 12a and 12b function as twin boat hulls and may be fabricated in accordance with techniques well known in the art of marine construction and air frame design. FIG. 1 depicts a cutaway illustration of starboard body member 12a which comprises stringers generally denoted by the reference numeral 26, frames or bulkheads 28, and an outer skin 30. Each body member 12a and 12b has an elliptical cross-sectional profile as best seen in FIGS. 2 and 3, when viewing the entire assembly 10 from forward and aft positions, respectively. The axially converging and diverging profile creates a "ram effect" by inducing pressure by decelerating and then accelerating fluid movement past body members 12a and 12b when flying boat 10 is operating on the water. This assists in reducing water drag during the takeoff phase and during water maneuvering. Since body members 12a and 12b are essentially hollow, provisions may be made therein for carrying a fuel system comprising forward and aft fuel tanks 32 and 34, respectively, which are interconnected by a microprocessor controlled fuel transfer system 36 so that fuel may be transferred in accordance with center of gravity requirements during transitory periods between vertical and conventional flight so as to minimize pitching moments about the aircraft's center of gravity. The microprocessor can function on input data of the aircraft's gross weight, flying speed, altitude, orientation, and load factors from which it can then determine the optimum location of the aircraft's center of gravity at any precise moment in time and transfer fuel accordingly. If it is desired to use mechanical in lieu of, or in conjunction with, fluidic methods for ballast control, the detailed description hereinafter referring to placement of the propulsion system will address that option.

A forward fuselage 14 is interposed between and rigidly attached to body members 12a and 12b proximal to first end 22 as shown in FIGS. 1 and 4. Forward fuselage 14 is configured as a lifting body in the shape of an airfoil which comprises an upper cambered skin surface 38 and a lower cambered skin surface 40, both rigidly held together as an integral assembly by a plurality of frames generally denoted by the reference numeral 42, and ribs 44, which terminate at leading edge 46 and trailing edge 48, as depicted in FIGS. 1, 2, and 3. Extending vertically outward from and integral with forward fuselage 14, are a plurality of aerodynamically shaped "fin-like" members 50 which provide pivotal attachment means for propulsion means 20 and rigid attachment provisions for wings 16a and 16b. The cockpit area 52 is shown for illustrative purposes proximal to first end 22. It is important to note that flying boat 10 may be constructed as a relatively large passenger carrying aircraft in which case forward fuselage 14 may be configured to transport a large amount of passengers and/or cargo.

Figure 7:
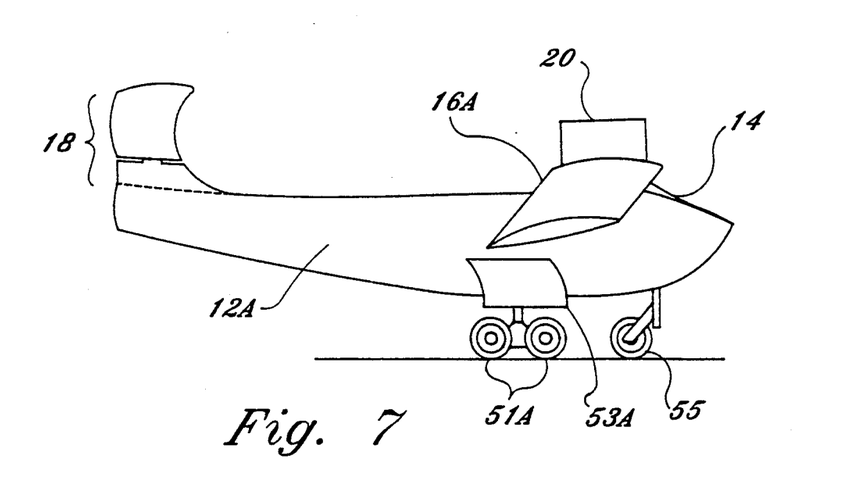
FIG. 7 is a side elevational view of the flying boat.

For amphibious operations, a retractable landing gear system may be employed configured as a tricycle arrangement as illustrated in FIGS. 3 and 7. Main gear assemblies 51a and 51b, and gear doors 53a and 53b, are integral with body member 12a and 12b, respectively. Nose wheel assembly 55 is extendable from within forward fuselage 14 and is sealed by gear doors 57a and 57b. The landing gear assemblies are of the type well known in the art and can be configured to optimize space and weight.

A pair of wings 16a and 16b are rigidly attachable to forward fuselage 14 at the interface with vertical "fin-like" members 50. The wings are of conventional construction, comprising a plurality of ribs 54, dual spars 56, leading edge 58, and trailing edge 60, the entire structure thereof sandwiched between upper skin 62 and bottom skin 64. Ailerons 66a and 66b and/or spoilers 68a and 68b may be used to effectuate roll control and are attachable to means for their actuation 70 in accordance with standard aircraft design as well known in the art. Similarly, slats 71a and 71b and flaps 73a and 73b may be provided to assist in low speed handling so as to reduce $V_{mc}$ (minimum control velocity). Fuel cell 72a and 72b integral with wings 16a and 16b, respectively, may be provided for additional fuel storage and are fluidly connectable to fuel transfer system 36.

Stabilizer means 18 for providing pitch and yaw stability and modulation are attachable to elongated body members 12a and 12b at second end 24 thereof. In the preferred embodiment, stabilizer means 18 is a unified tail structure comprising an arcuate airfoil which spans the gap between starboard body member 12a and port body member 12b, and which is hingedly and pivotally connectable thereto such that movement along three axes is facilitated. In this manner, the single unit functions as a "ruddervator." Pitch control is achieved by rotating the assembly relative to the longitudinal axis of the aircraft and yaw control is accomplished by pivoting the assembly transversely relative to the aircraft, each of which may be performed simultaneously. This configuration mitigates the weight and drag penalties associated with conventional designs which utilize a separate vertical and horizontal stabilizer. If desired, it is envisioned that a conventional tail plane may be employed comprising twin vertical stabilizers 74a and 74b having dual rudders 75a and 75b, respectively, and horizontal stabilizer 76 having elevator 77, as depicted in FIG. 4.

In the preferred embodiment, stabilizer means 18 comprise a pair of arcuate spars 78, each joined by a leading edge 80, trailing edge 82, and sandwiched between upper skin 84, and lower skin 86. A plurality of ribs 88 and cross-bracing 90 are added for structural integrity. Spars 78 are rigidly attachable to pivotal and hinged means for attachment 92 which are connectable to the aircraft's flight control system as is well known in the art. Means for trimming pitch and yaw by adjusting the longitudinal and transverse angle of incidence of stabilizer means 18 may be incorporated into the flight control system and means for attaching 92.

Body members 12a and 12b, forward fuselage 14, wings 16a and 16b, and stabilizer means 18 may be fabricated from aluminum alloy by traditional manufacturing methods whereby individual components are riveted and bonded together, or from composite materials including, but not limited to, fiberglass, graphite, and kevlar, by co-molding each assembly into a unitary structure. Such process may include hand or numerical machine controlled ply layups utilizing either pre-preg material which is laid up in a tool and subsequently cured in an autoclave, or woven material in an RTM (resin transfer molding) process, as is common in the modern aerospace industry. Such construction results in a higher realized strength and stiffness per pound of structure which translates into higher payloads and overall aircraft performance.

At least one propulsion means 20 is pivotally attached to forward fuselage 14 between vertical members 50 proximal to the longitudinal centerline of the aircraft. By placing more than one propulsion means 20 near the aircraft centerline, the redundancy offered by several power plants does not require heavy and mechanically complex cross-shafting to eliminate the high rolling moments generated due to asymmetric thrust following an engine failure. Accordingly, an appreciable weight savings is realized and maintenance is reduced and made less complex.

Figure 5:
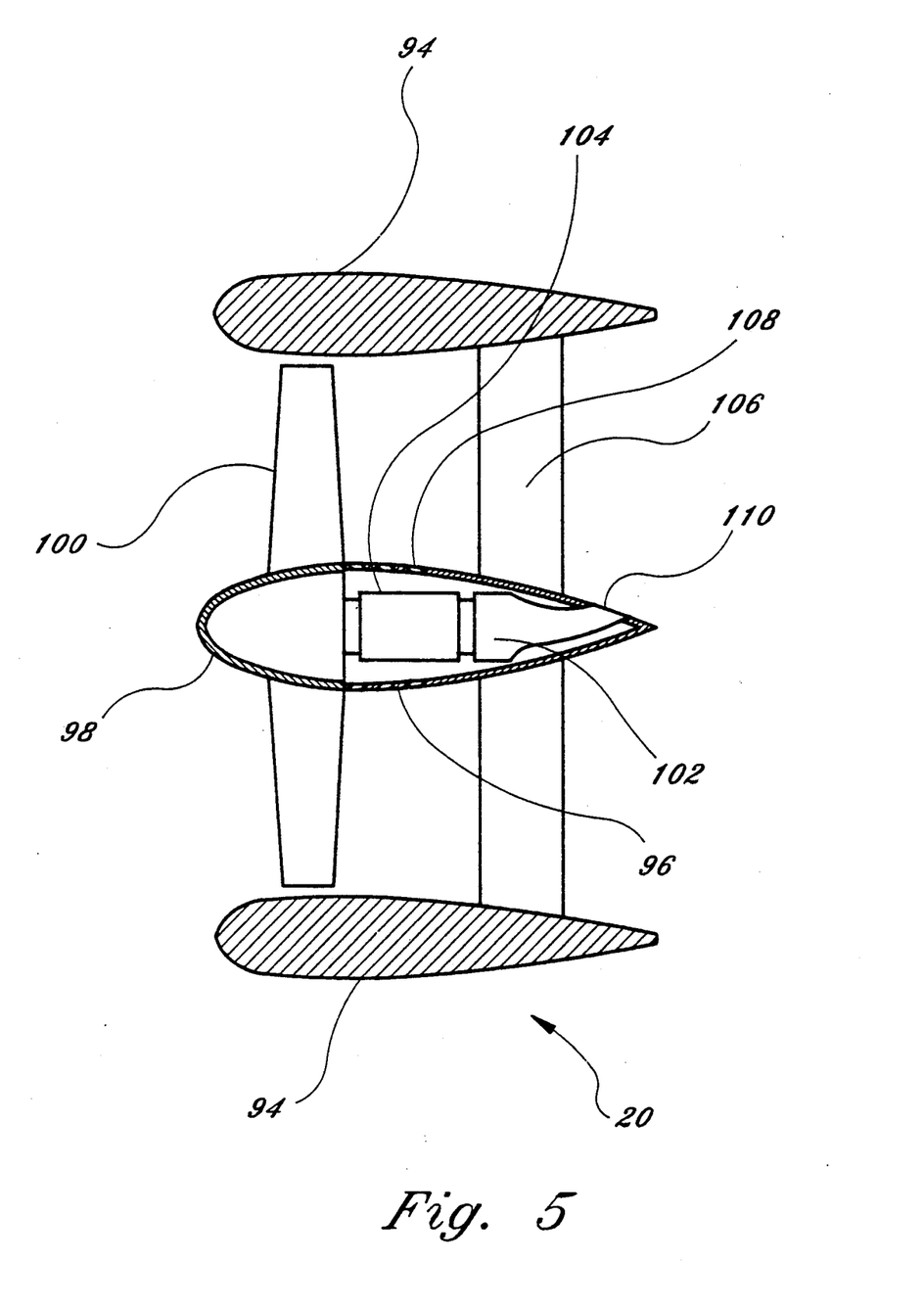
FIG. 5 is a sectional view of a propulsion unit.
Figure 6:
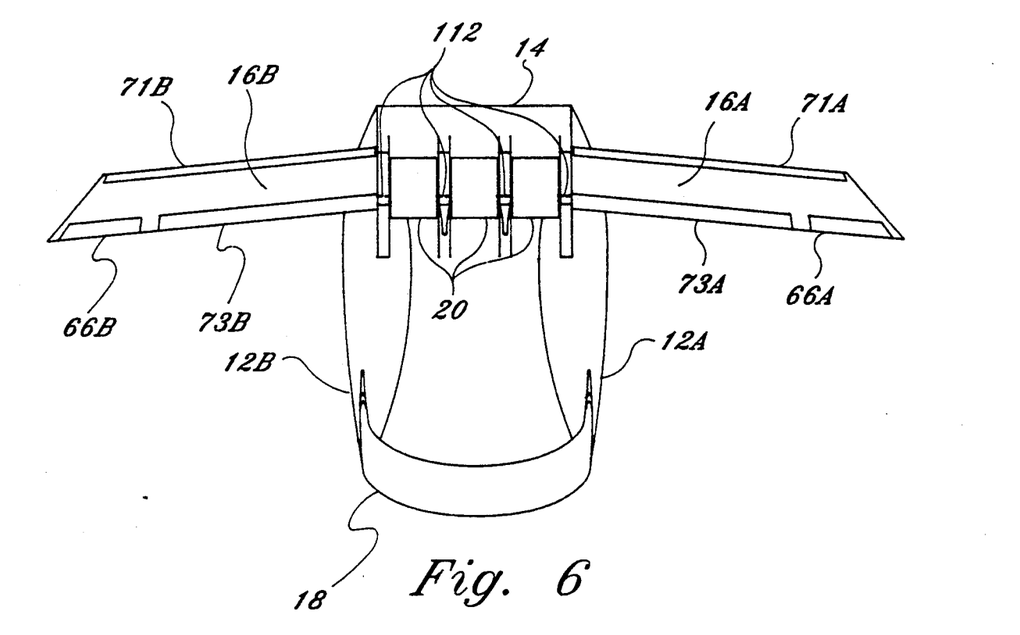
FIG. 6 is a plan view of the flying boat in the preferred embodiment.

In the preferred embodiment, propulsion means 20 is a ducted fan configuration as is illustrated in FIG. 5. The ducted fan offers the following advantages: greater thrust per engine power output than an open propeller, a reduction in propeller generated noise through acoustic dissipation, and protection of the fan blades from potential injurious impact with people and foreign objects and debris. Each propulsion means 20 (hereinafter referred to as "fan unit") generally comprises an airfoil contoured cylindrical shroud 94 and an attached collinearly disposed center body 96 comprising: a spinner 98 and attached fan blades 100, an engine 102 and gear box 104, the center body 96 attachable to cylindrical shroud 94 by a plurality of stator vanes 106 in a manner well known in the art. The fan parameters such as inlet and outlet cross-sectional area, shroud thickness, and blade design and orientation are determined pursuant to performance requirements as is engine horsepower, by methods well known in the arts of aerodynamics and aircraft design. Engine 102 may be either of the gas turbine or reciprocating internal combustion type. Since the engine is internally disposed within center body 96, air inlet 108 and exhaust ducting 110 are incorporated therein to provide a steady flow of intake and cooling air, and to evacuate engine exhaust.

Each ducted fan unit 20 has integral pivotal attachment mean schematically denoted as 112, disposed axially aft of the center of gravity thereof which permit rotation through varying angles of incidence relative to the aircraft such that vertical flight and the transitions to and from conventional flight may be accomplished. By locating the pivot point aft of the fan unit's center of gravity, the center of gravity location of the entire aircraft is shifted linearly aft toward the center of lift when in vertical flight modes, thereby reducing undesirable pitching moments otherwise generated therein, minimizing the need for ballast controls and/or excessive aerodynamic trim.

The placement of fan unit 20 above forward fuselage 14 serves two important functions. Firstly, upper surface 38 of forward fuselage 14 is cambered in such a way as to optimize the airflow thereover generated by each ducted fan such that additional lift is induced by the "coanda effect." The coanda effect operates pursuant to the Bernouli principle, the latter standing for the proposition that when the velocity of a fluid such as air increases, its pressure drops, and conversely, when the velocity of the fluid decreases, its pressure rises. By blowing thrust across cambered upper surface 38, the accelerated airflow causes a drop in air pressure and consequent suction of forward fuselage 14 due to the higher air pressure along lower surface 40 and the resulting pressure differential. The second benefit derived from this fan unit location results from the slip stream travelling directly across stabilizer means 18, thereby enhancing pitch and yaw response when power is increased.

Figure 8:
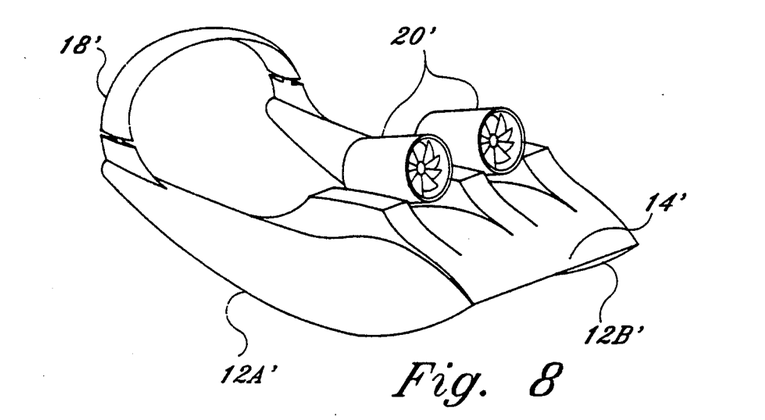
FIG. 8 is an isometric view of the flying boat in an alternative embodiment with the wings removed for clarity.
Figure 9:
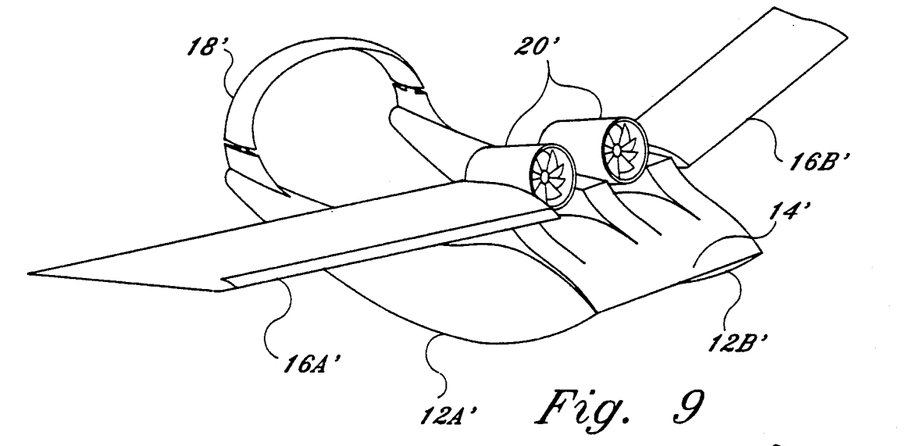
FIG. 9 is an isometric view of the flying boat in an alternative embodiment.
Figure 10:
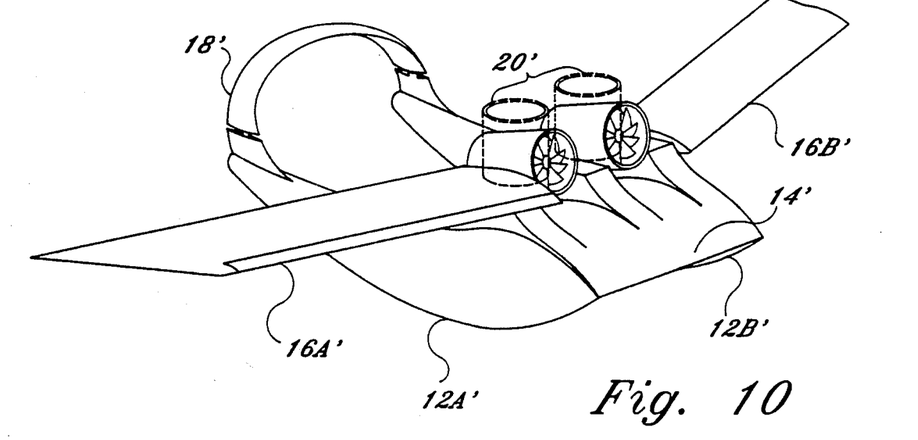
FIG. 10 is an isometric view of the flying boat in an alternative embodiment depicting the pivotal range of motion of the propulsion units.

FIGS. 8, 9, and 10 depict an alternative embodiment employing twin fan units 20'. The overall design and configuration are generally the same. FIG. 10 illustrates how the fan units 20' may be rotated from the horizontal for conventional flight to the vertical and vice versa.

The invention has been described herein in what is considered to be the most practical and preferred embodiment. It is anticipated, however, that departures may be made therefrom and that obvious modifications will be implemented by a person skilled in the art.

I claim:

1. A V-STOL (Vertical Short Take-Off and Landing) flying boat, comprising:
   a pair of buoyant, coterminous, and elongated body members, each having an exterior surface which defines an axially converging and diverging profile, said body members having first and second ends;
   a buoyant forward fuselage interposed between, and rigidly attachable to, said elongated body members proximal to said first end, said forward fuselage having an upper and lower surface, wherein said first ends of said body members and said forward fuselage are integrally combined, forming a planar member such that the entire structure thereof functions as a lifting body;
   a pair of aerodynamic wings rigidly attachable to said forward fuselage, said wings having integral means for providing roll control;
   stabilizer means for imparting pitch and yaw stability and modulation adjustably attachable to said elongated body members; and
   at least one propulsion means pivotally attachable to said forward fuselage, whereby said propulsion means is configured to provide varying angles of incidence of rearward thrust, thereby effectuating a range of motion of said flying boat from vertical short take-off through the transition to level flight.

2. The V-STOL flying boat recited in claim 1, wherein said forward fuselage comprises an airfoil configuration having at least one cambered side.

3. The V-STOL flying boat recited in claim 1, wherein said forward fuselage has integral means for pivotally attaching said propulsion means thereto.

4. The V-STOL flying boat recited in claim 3, wherein said integral means for pivotally attaching said propulsion means comprise a plurality of aerodynamically contoured vertical fin-like members.

5. The V-STOL flying boat recited in claim 1, wherein said propulsion means comprise:
   an airfoil contoured cylindrical shroud;
   a center body axially and collinearly disposed with the longitudinal axis of said cylindrical shroud, said center body comprising:
   an aerodynamic spinner having a plurality of fan blades secured thereto;
   a power plant rigidly securable to said center body;
   a gear box disposed between, and rotatably attachable to, said aerodynamic spinner and said power plant, respectively;
   a plurality of stator vanes rigidly attaching said center body to said cylindrical shroud and configured to optimize the air flow through said shroud; and
   pivotal attachment means integral with said shroud disposed axially aft of said propulsion means center of gravity, whereby said center of gravity of said propulsion means may be translated linearly aft toward the center of lift of said wings during vertical flight modes to neutralize undesirable pitching moments, said propulsion means attachment further disposed to maximize beneficial lift-thrust components from the coanda effect induced by the thrust from said propulsion means blowing across the upper surface of said forward fuselage.

6. The V-STOL flying boat recited in claim 1, wherein said stabilizer means comprise a unified tail structure, said unified tail structure further comprising a spanwise arcuate air foil pivotally and hingedly connectable to said elongated body members, thereby facilitating movement along three axes.

7. The V-STOL flying boat recited in claim 1, further comprising forward and aft fuel tanks and a microprocessor controlled fuel transfer system for transferring fuel between said forward and aft tanks to modulate the station location of said flying boat's center of gravity during transitions between vertical and conventional flight.

8. A V-STOL flying boat, comprising
   a pair of buoyant, coterminous, and elongated body members, each having an exterior surface which defines an axially converging and diverging profile, said body members having first and second ends;
   a buoyant forward fuselage interposed between, and rigidly attachable to, said elongated body members proximal to said first end, said forward fuselage having an upper and lower surface, whereof at least one of said surfaces is cambered in an airfoil configuration, wherein said first ends of said body members and said forward fuselage are integrally combined, forming a planar member such that the entire structure thereof functions as a lifting body;

a pair of aerodynamic wings rigidly attachable to said forward fuselage, said wings having integral means for providing roll control;

stabilizer means for imparting pitch and yaw stability and modulation, said stabilizer means comprising a unified tail plane which further comprises a spanwise arcuate air foil pivotally and hingedly connectable to said elongated body members, thereby facilitating movement along three axes a plurality of propulsion means pivotally attachable to said forward fuselage proximal to aid flying boat's longitudinal centerline by a plurality of integral aerodynamically contoured vertical finlike members, said propulsion means comprising:

an airfoil contoured cylindrical shroud;

a center body axially and collinearly disposed with the longitudinal axis of said cylindrical shroud, said center body comprising:

an aerodynamic spinner having a plurality of fan blades of adjustable pitch securable thereto;

a power plant rigidly securable to said center body;

a gear box disposed between, and rotatably attached to, and aerodynamic spinner and said power plane, respectively;

a plurality of stator vanes rigidly attaching said center body to said cylindrical shroud and configured to optimize the air flow through said shroud; and pivotal attachment means integral with said shroud disposed axially aft of said propulsion means' center of gravity, whereby said center of gravity of said propulsion means may be translated linearly aft toward the center of lift of said wings during vertical flight modes to neutralize undesirable pitching moments and to facilitate the transition to conventional flight, said propulsion means' propulsion attachment further disposed to maximize beneficial lift and thrust generated from the coanda effect induced by thrust from said propulsion means flowing across the upper surface of said forward fuselage.

9. The V-STOL flying boat recited in claim 8, wherein said stabilizer means further comprise means for aerodynamically trimming pitch, yaw and roll.

10. The V-STOL flying boat recited in claim 8, wherein said power plant comprises a gas turbine engine.

11. The V-STOL flying boat recited in claim 8, wherein said power plant comprises an internal combustion engine.

12. The V-STOL flying boat recited in claim 8, wherein said power plant comprises an electric motor driven by a remotely located power source and electrical generator.

13. The V-STOL flying boat recited in claim 8, further comprising wheel means integral with said elongated body members and forward fuselage for land operations.

* * * * *